July 17, 1956

C. M. ECHEVERRIA, JR 2,754,915

BLADE HAVING SYMMETRICAL EXTRUDED SPAR

Filed April 7, 1950

CHORDWISE C.G. OF SPAR AND BLADE, FEATHERING AXIS, AND AERODYNAMIC CENTER OF BLADE

CHARLES M. ECHEVERRIA, Jr.
INVENTOR

BY

ATTORNEY

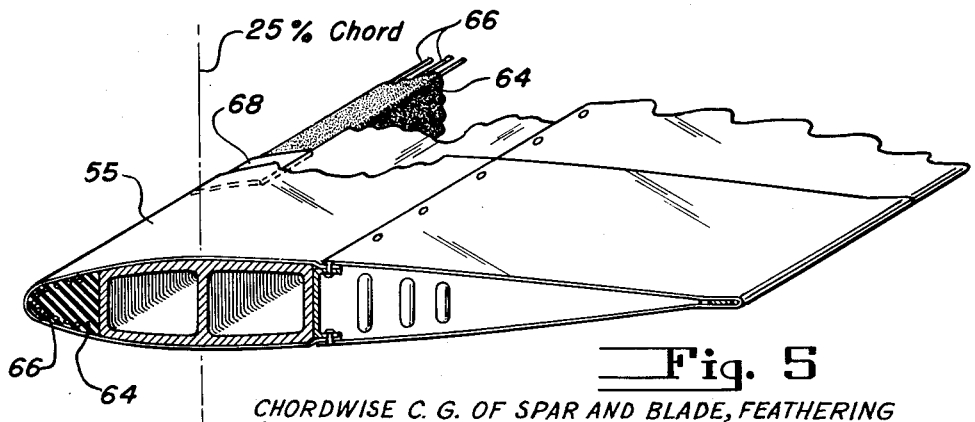
CHORDWISE C.G. OF SPAR AND BLADE, FEATHERING AXIS, AND AERODYNAMIC CENTER OF BLADE
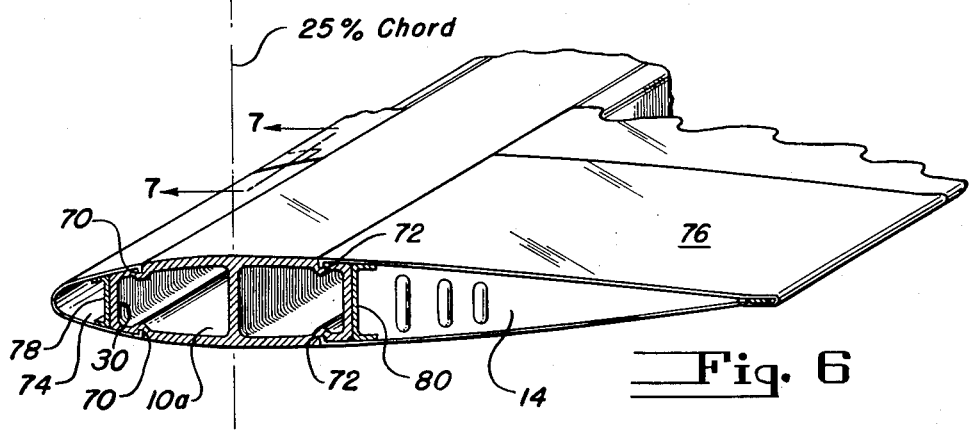
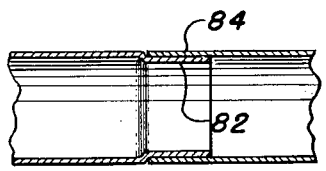

United States Patent Office 2,754,915
Patented July 17, 1956

2,754,915
BLADE HAVING SYMMETRICAL EXTRUDED SPAR

Charles M. Echeverria, Jr., Bridgeport, Conn., assignor to United Aircraft Corporation, East Hartford, Conn., a corporation of Delaware Application April 7, 1950, Serial No. 154,620

10 Claims. (Cl. 170—159)

This invention relates to improvements in metal blades for rotary wing aircraft of the type disclosed in the Sikorsky Patent No. 2,469,480, issued May 10, 1949.

In rotary wing aircraft equipped with blades of this type, certain stick forces occur which I have traced to the fact that the chordwise neutral axes of the several blades lie ahead of the gravity axes of the blades resulting in a bending forward of the blades in their plane of rotation as they are rotated. It is understood that by chordwise neutral axis is meant the axis of zero strain during any bending of the blade in the plane of rotation. For a rotor blade this may be considered as a plane passing thru the centroid of the spar and perpendicular to the chord. By chordwise gravity axis is meant the locus of the centers of gravity of like adjacent blade elements taken along the span of the blade.

It is an object of the present invention to provide an improved construction for such a metal blade in which the chordwise gravity axis and chordwise neutral axis of the blade are substantially coincident.

Another object of the invention is to provide an improved spar for such a metal blade which is substantially symmetrical about its major and minor neutral axes so that its chordwise center of gravity at any section can be made to be coincident with the chordwise neutral axis and with the chordwise center of gravity of the entire blade at said section.

A further object of the invention is to provide a rotor blade of this general type in which the center of gravity and the aerodynamic center of the blade are in the same plane as the center of gravity, sheer center, and chordwise neutral axis of the spar.

A further object of the invention is to improve the construction and performance of metal rotor blades for rotary wing aircraft.

These and other objects and advantages of the invention will either be obvious or will be pointed out in the following description of several embodiments of the invention shown in the accompanying drawings.

In these drawings,

Figs. 4 and 5 show still further modified forms of the blade;

Fig. 6 shows a still further modification which is particularly advantageous when it is desired to connect the blade parts by adhesives;

Fig. 7 is a detailed section on line 7—7 of Fig. 6.

Figure 2:
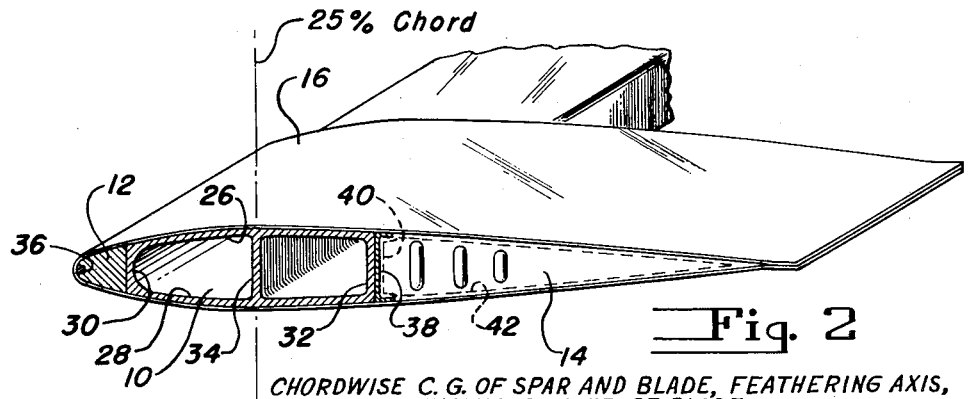
Fig. 2 is a perspective view of the rotor blade of Fig. 1, parts being shown in section and parts being broken away to facilitate illustration.
Figure 1:
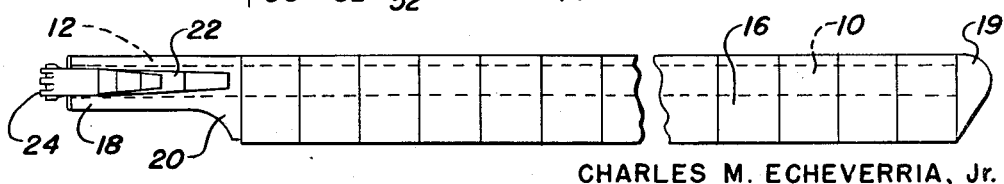
Fig. 1 is a plan view of a rotor blade constructed in accordance with this invention.

As shown in Figs. 1 and 2, the blade consists essentially of a spar member 10 of improved construction, a leading edge member 12, a plurality of trailing ribs 14, and a series of chordwise wrap-around cover members 16 arranged spanwise along the blade which are adhesively secured to and hold the spanwise extended blade parts in assembled position. The blade is completed by a plate member 18 at its inboard end, a tip member 19 which closes off the outboard end of the blade and a fairing member 20. The blade is supported on the rotor hub (not shown) by means of a cuff attaching member 22 having a hinge member 24 or a suitable threaded connection by which the blade is attached to the blade root member on the hub in a usual manner.

The spar member 10 which is of metal and is hollow and tubular, forms the main structural element of the blade and has upper and lower walls 26 and 28 which conform to the airfoil contour of the blade throughout a substantial chordwise extent of the blade. Further the spar member has forward aft and intermediate webs 30, 32 and 34 respectively, which are suitably faired into the upper and lower walls to avoid stress concentrations in the metal. Preferably, the spar member comprises an extrusion of uniform cross section throughout its length and hence of one piece. By a "one piece" spar member is meant a member, such as an extruded member, which avoids all riveted or welded seams with their resulting uncertainties. In this way uniform spars can be produced having predictable structural properties.

In accordance with this invention the spar 10 is, insofar as is practical, symmetrical in cross section fore and aft of the intermediate rib 34, although in order to conform to the airfoil contour of the blade the forward web 30 in Fig. 2 is shown as slightly shorter than the aft web 32. This slight departure from symmetry may be compensated for by making the fairing of the opposite web 30 slightly heavier. This condition might be reversed depending on the particular airfoil section chosen.

In blades of this general type unexplained stick forces occurred which I have found are the result of the shape of the spar used in these blades. The prior spars were made with a heavy concentration of metal forming the leading edge of the blade in order to balance the blade about its feathering axis. This made the spar itself chordwise unbalanced to such an extent that the neutral axis of the blade (the same as that of the spar inasmuch as the spar was the only strength member) lay ahead of the gravity axis of the blade resulting when the blade was rotated, in a moment, caused by the centrifugal force acting thru the center of gravity of the blade, tending to bring the center of gravity of the blade in coincidence with the strength center (neutral axis of the spar) and thus to bend the blade forward in its plane of rotation. As the blade was deflected forward, the center of lift on the outboard portion was moved ahead of the feathering axis which lies on the gravity axis. Due to the downwash being greater over the rear portion of the rotor disc, when a blade was over the nose of the fuselage it had a smaller pitch increasing moment than the blade over the rear of the fuselage. This cyclic difference in blade pitching moments would then be integrated by the swashplate as a steady stick force increasing with the speed of the aircraft. Since the controls lead the blades by 90 deg., this differential of the two up-loads from the positive blade pitching moments then became a load acting downward on the left or retreating side of the swashplate (assuming counterclockwise rotation of the rotor) and passed through the control linkage to move the stick to the left.

I have found that by constructing the spar so that its cross section is substantially symmetrical the blade can be constructed so that the gravity axis and the neutral axis of the blade are coincident and both can be made coincident with the feathering axis. This is accomplished in the Figs. 1 and 2 construction by having the axis of symmetry of the spar at the intermediate web 34 and by locating this web on the aerodynamic center which for example may be the 25% chord line of the blade. The blade is completed forward of the spar by the forwardly projecting cover members 16 and aft of the spar by a series of separate pockets disposed spanwise along the spar 10. A spanwise nose piece is located within the forward part of a cover member 16.

With the generally symmetrical spar member 10 located with its intermediate web 34 on the 25% chordline of the blade several ways of completing the fore and aft portions of the blade structure have been shown herein. In Fig. 2 the leading edge member, or nose member 12, within the forward part of a cover member 16 which completes the airfoil shape of the blade at the leading edge, may be of a solid member of wood or plastic weighted at its extreme leading edge by spanwise metal rod 36. The trailing edge portion of the blade is formed by a rearwardly facing channel member 38 which is adhesively secured to web 32 to which the ribs 14 are adhesively secured, these ribs having suitable flanges 40 by which they are secured to the channel 38 and similar flanges 42 by which they are secured to one of the wraparound cover members 16. The latter as shown in this figure extends from the trailing edge of the ribs 14 around the leading edge of the blade and back to the trailing edge where the upper and lower faces thereof are secured together. It will be understood that all of the blade parts may be adhesively secured to each other and to the wraparound member 16 to form an extremely rigid but light blade construction. Also, it will be noted that the wraparound members 16 are relatively short in their spanwise dimension. These members with their ribs 14 form a series of spanwise closed boxes aft of the spar member 10. These members form a series of spanwise forwardly projecting leading edge fairing members.

As a result of this construction described above, the gravity and torsional axes of the blade will be located at the middle web 34 of the spar which is also the feathering axis of the blade, and consequently no bending moments will be set up in the spar due to centrifugal forces and there will be no tendency for the blade to bend in its plane of rotation due to these centrifugal forces.

Figure 3:
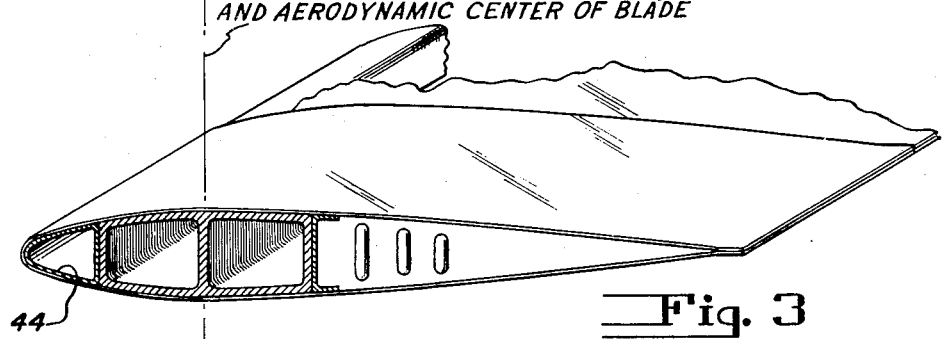
Fig. 3 is a view similar to Fig. 2 showing a modified leading edge construction.

Fig. 3 shows a somewhat similar construction in which the solid leading edge member 12 of Fig. 2 is replaced by a hollow stainless tubular leading edge member 44 which has the advantage that hot gases may be circulated through the leading edge of the blade for deicing purposes. Member 44 would be secured within the forwardly projecting portion of chordwise wrap-around cover members 16 so as to prevent it from carrying any structural loads.

Figure 4:
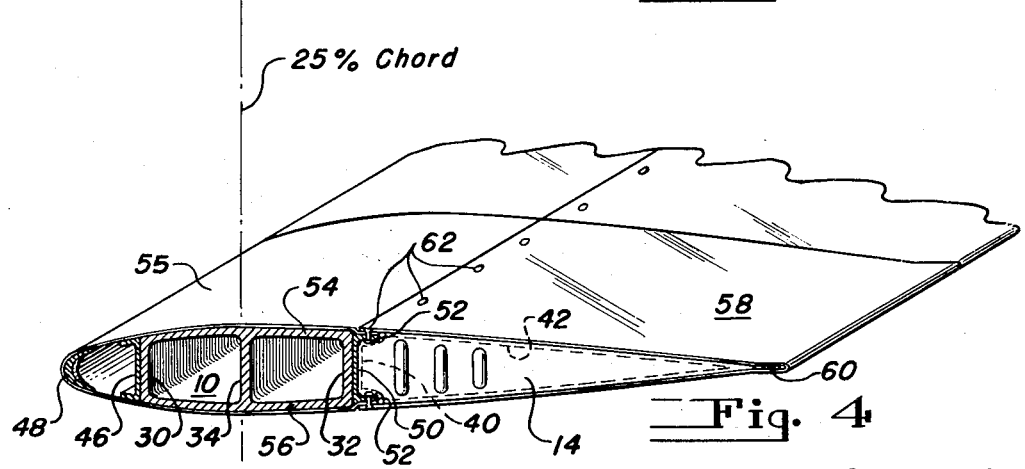

Fig. 4 shows a further modified construction in which the nose of the blade is completed by a forwardly facing channel member 46 cut into reasonably short sections and adhesively secured to the forward web 30 of the spar and a cooperating nose block 48. In this modification a channel member 50 is adhesively secured to the aft web 32 of the spar having rearwardly facing flanges 52 which are spaced somewhat closer together than the outer surfaces 54 and 56 of the spar member 10 to form in effect rabbets to receive the overlapped ends of a two-part cover wrapped chordwise about the blade assembly. The cover for the blade is made in two parts 55 and 58 of which the former is wrapped around the spar and nose structure to which it is adhesively secured and overlies the flanges 52. The flanges 40 of ribs 14 are adhesively secured to the channel 50 as before and flanges 42 thereof are adhesively secured to the cover part 58, this latter being wrapped around a trailing edge phenolic strip 60 just aft of the ribs 14. If desired, a plurality of rivets 62 may be provided to secure the overlapping edges of the cover parts 55 and 58 to flanges 52.

Fig. 5 shows a similar construction except that the nose piece comprises a rubber-like moulded member 64 in which heating wire 66 are embedded. In this construction reinforcing plate 68 of U-shape may be provided at the leading edge of the blade beneath the cover members 55 as the junction between adjacent cover members, it being understood that these members are adhesively secured in position before the moulded member 64 is poured.

Fig. 6 shows a still further modified construction which may be used. In this construction a generally symmetrical spar member 10a is formed with spanwise kerfs 70 and 72 in which the beaded edges of a metal nose piece 74 and an aft cover member 76 are received and adhesively attached. Suitable channels 78 and 80 are extended spanwise along the forward and aft faces of the spar as in some of the previously described forms of the invention such as channel member 46 which is formed of reasonably short sections. The channel 78 is adhesively secured to the forward web 30 and serves to reinforce the nose pieces 74, while the channel 80 serves as before to support the ribs 14 which cooperate with the cover 76 to form the trailing edge pockets. In order to provide a strong leading edge for the blade, the nose pieces 74 may have telescoping adjacent ends 82 and 84 as shown most clearly in Fig. 7.

It will be evident that as a result of this invention a blade has been provided which has its center of gravity, its neutral axis, and its aerodynamic center located on the feathering axis of the blade so that the blades of the rotor will not be deflected in the plane of their rotation due to the centrifugal forces set up as they rotate, and the undesirable lateral forces on the controls will be eliminated. This is accomplished, as disclosed hereinbefore, by constructing the leading edge of the rotor blade of a plurality of nose sections or forward fairing members and the trailing edge of the rotor blade of a plurality of aft members or aft fairing means and attaching them to the spar to maintain the center of gravity of the blade and the neutral axis of the blade coincident.

Other rotor blade applications assigned to applicant's assignee are application Serial No. 546,072 filed November 10, 1955 as a continuation-in-part of application Serial No. 271,522 filed February 14, 1952, now abandoned; application Serial No. 186,021 filed September 21, 1950; and application Serial No. 312,590 filed October 1, 1952.

Various changes in the construction and arrangement of the blade parts may be resorted to without departing from the scope of the invention.

I claim:

1. In a rotor blade for rotary wing aircraft having an airfoil contour, structural spar means having upper and lower surfaces generally conforming to the airfoil contour of the blade and comprising the principal load carrying member of the blade, said spar means having a chordwise neutral axis substantially coincident with the chordwise gravity axis of the blade spanwise throughout an active portion of the blade, fairing means carried by said spar means having its chordwise center of gravity substantially coincident with the chordwise neutral axis of the spar means for completing the airfoil contour of the blade in a chordwise direction, said fairing means comprising a plurality of segments carried by said spar means to maintain the chordwise neutral axis of the blade substantially coincident with the chordwise neutral axis of the spar means.

2. A rotor blade for rotary wing aircraft having a spar with upper and lower surfaces generally conforming to the airfoil section of the blade and comprising the principal load carrying member of the blade, said spar having a chordwise neutral axis substantially coincident with the chordwise gravity axis of the blade spanwise throughout an active portion of the blade, first means carried by said spar for completing the airfoil contour of the blade in a chordwise direction forward of said spar, second means carried by said spar for completing the airfoil contour of the blade in a chordwise direction aft of said spar, the center of gravity of the combination of said means being substantially coincident with the chordwise neutral axis of said spar, and each of said first and second means being segmented to provide a plurality of segments carried by said spar to maintain the chordwise neutral axis of the blade substantially coincident with the chordwise neutral axis of the spar throughout said active portion of said blade.

3. A metal blade for a rotary wing aircraft having a spar comprising the main strength member of said blade, said spar having its chordwise center of gravity and neutral axis substantially coincident with the 25 per cent chordline of the blade, a plurality of trailing edge members connected to said spar producing a weight moment about said 25 per cent chordline, a plurality of leading edge members connected to said spar having a weight moment about said 25 per cent chordline which is substantially equal to the first named weight moment, said leading edge and trailing edge members positioning the chordwise center of gravity and neutral axis of the blade substantially coincident to each other and to the corresponding axes of the spar throughout an active portion of the blade.

4. A metal blade for a rotary wing aircraft having a spar comprising the main strength member of said blade, said spar having its chordwise center of gravity substantially coincident with the 25 per cent chordline of the blade, a plurality of adjacent fairing members extending fore and aft of said spar and connected thereto, the weight of said members forward of said 25 per cent chordline producing a moment about said chordline equal and opposite to the moment produced by the weight of said members aft of said 25 per cent chordline about said chordline, said blade having a chordwise neutral axis, said fairing members positioning said neutral axis of the blade substantially coincident with the center of gravity of the blade throughout a substantial portion of the blade.

5. In a rotor blade for rotary wing aircraft having an airfoil contour, a spar having upper and lower surfaces generally conforming to the airfoil contour of the blade and comprising the principal load carrying member of the blade, said spar having a chordwise neutral axis substantially coincident with the chordwise gravity axis of the blade spanwise throughout an active portion of the blade, fairing means conforming to the airfoil contour of the blade in a chordwise direction carried by said spar, said fairing means having its chordwise center of gravity substantially coincident with the chordwise neutral axis of the spar, said fairing means comprising a plurality of segments carried by said spar constructed and arranged so as to place the chordwise neutral axis of the blade on or substantially near the chordwise neutral axis of the spar.

6. A blade for rotary wing aircraft comprising a hollow spar the outer surface of which conforms generally to the airfoil contour of the blade chordwise from a point aft of the leading edge for a distance past the quarter chord axis of the blade, said spar comprising the primary structural member of said blade, a plurality of adjacent nose members attached to said spar for completing the airfoil contour of the blade in a chordwise direction forward of said spar, a plurality of adjacent aft members attached to said spar for completing the airfoil contour of the blade in a chordwise direction aft of said spar, said blade having a chordwise neutral axis, said nose members and aft members positioning said neutral axis of the blade substantially coincident with the center of gravity of the blade throughout a substantial portion of the blade.

7. A rotor blade for rotary wing aircraft having a spar having upper and lower surfaces generally conforming to the airfoil section of the blade and comprising the principal load carrying member of the blade, said spar having a chordwise neutral axis substantially coincident with the chordwise gravity axis of the blade spanwise throughout an active portion of the blade, a plurality of nose pieces carried by said spar for completing the airfoil contour of the blade in a chordwise direction forward of said spar, a plurality of cover members carried by said spar for completing the airfoil contour of the blade in a chordwise direction aft of said spar, the center of gravity of the combination of said nose pieces and cover members being substantially coincident with the chordwise neutral axis of said spar.

8. A metal rotor blade for rotary wing aircraft having a spar member including upper and lower surfaces which conform generally to the airfoil contour of the blade, said spar member having a chordwise neutral axis, said spar member having fore and aft surfaces which extend spanwise, means extending forwardly of the fore surface of said spar forming the nose part of said blade and extending rearwardly of the aft surface of said spar forming the trailing part of said blade, said means comprising a plurality of forwardly projecting nose sections, said means comprising a plurality of rearwardly projecting trailing sections, said means extending forwardly and rearwardly being in a plurality of sections so as to place the neutral axis of said blade on, or substantially near, the neutral axis of said spar, the chordwise gravity axis of said blade being located substantially coincident with the neutral axis of said blade.

9. A rotor blade for rotary wing aircraft having an airfoil contour including a spar having top and bottom walls with upper and lower surfaces generally conforming to the airfoil contour of the blade and comprising the principal load carrying member of the blade, said spar having fore and aft spanwise walls connecting and spacing said top and bottom walls, a spanwise web connecting said top and bottom walls midway between its fore and aft walls, said spar having a chordwise neutral axis located at said web substantially coincident with the chordwise gravity axis of the blade spanwise throughout an active portion of the blade, fairing means conforming to the airfoil contour of the blade in a chordwise direction carried by said spar, said fairing means having its chordwise center of gravity substantially coincident with the chordwise neutral axis of the spar, said fairing means comprising a plurality of segments carried by said spar arranged to position the neutral axis of the blade substantially coincident with the chordwise neutral axis of the spar.

10. A metal blade for a rotary wing aircraft having a spar comprising the main strength member of said blade, said spar having its chordwise center of gravity substantially coincident with the 25 per cent chordline of the blade, a plurality of adjacent trailing edge members connected to said spar producing a weight moment about said 25 per cent chordline, a plurality of adjacent leading edge members connected to said spar having a weight moment about said 25 per cent chordline which is substantially equal to the first named weight moment, said blade having a chordwise neutral axis, said leading and trailing edge members positioning said neutral axis of the blade substantially coincident with the center of gravity of the blade throughout a substantial portion of the blade.

References Cited in the file of this patent

UNITED STATES PATENTS

| Number | Name | Date |
|---|---|---|
| 1,317,032 | Page | Sept. 23, 1919 |
| 1,501,606 | Leitner | July 15, 1924 |
| 1,576,995 | Prowse | Mar. 16, 1926 |
| 1,758,360 | Fox | May 13, 1930 |
| 2,070,657 | Hafner | Feb. 16, 1937 |
| 2,210,163 | Boyd | Aug. 6, 1940 |
| 2,225,779 | Hart-Still | Dec. 24, 1940 |

(Other references on following page)

UNITED STATES PATENTS

| | | | |
|---|---|---|---|
| 2,272,439 | Stanley | Feb. 10, | 1942 |
| 2,337,007 | Vidal | Dec. 14, | 1943 |
| 2,362,804 | Cox | Mar. 14, | 1944 |
| 2,400,649 | Larsen | May 21, | 1946 |
| 2,430,948 | Platt | Nov. 18, | 1947 |
| 2,450,455 | Snyder | Oct. 5, | 1948 |
| 2,460,351 | Hoffman | Feb. 1, | 1949 |
| 2,465,007 | Bragdon | Mar. 22, | 1949 |
| 2,469,480 | Sikorsky | May 10, | 1949 |
| 2,475,337 | Platt | July 5, | 1949 |
| 2,483,134 | Gitz | Sept. 27, | 1949 |
| 2,535,917 | Gruetjen | Dec. 26, | 1950 |
| 2,589,193 | Mayne | Mar. 11, | 1952 |
| 2,620,884 | Gluhareff | Dec. 9, | 1952 |
| 2,647,586 | Gruetjen | Aug. 4, | 1953 |

FOREIGN PATENTS

| | | | |
|---|---|---|---|
| 52,856 | Netherlands | July 15, | 1942 |